(12) United States Patent
Lantz (10) Patent No.: US 7,278,322 B1
(45) Date of Patent: Oct. 9, 2007

(54) SEMICONDUCTOR BASED PRESSURE SENSOR

(75) Inventor: Mark Alfred Lantz, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/394,006

(22) Filed: Mar. 30, 2006

(51) Int. Cl.
*G01L 21/12* (2006.01)
(52) U.S. Cl. .......................................... 73/754; 73/755
(58) Field of Classification Search .................. 73/754, 73/755
See application file for complete search history.

(56) References Cited

U.S. PATENT DOCUMENTS 4,541,286 A * 9/1985 Holme ........................ 73/755
4,995,264 A * 2/1991 Stocker et al. ................ 73/702
5,633,465 A 5/1997 Kaufmann et al.
6,227,056 B1 5/2001 Bills et al.
6,648,592 B2 * 11/2003 Escure et al. ............... 415/115

* cited by examiner

*Primary Examiner*—Andre J. Allen
(74) *Attorney, Agent, or Firm*—Eustus D. Nelson (57) ABSTRACT

The present invention provides a pressure sensor. The pressure sensor comprises a substrate with several support structures attached to the substrate. The pressure sensor further includes a strut structure integrated with a heating element. The strut structure is engaged with the support structures so as to create an air gap between the heating element and the substrate. The heating element has an electrical resistance proportional to changes in air pressure in the air gap.

18 Claims, 10 Drawing Sheets

SEMICONDUCTOR BASED PRESSURE SENSOR

FIELD OF THE INVENTION

The invention relates to the field of pressure sensing, and more specifically to semiconductor-based pressure sensors and methods for sensing pressure variations.

BACKGROUND

Pressure sensors can be used to measure pressure variations in air as well as any other gas. The pressure variations in a sample gas are measured against known values of pressure variations in air. These pressure variations are an important parameter in determining various properties of the sample gas. Pressure sensors that measure such pressure variations find widespread application in areas such as industrial process control, automobile engine monitoring and various biomedical processes.

One widely used technique for measuring pressure variations is the 'hot-wire' technique. Pirani gauges employ this technique for measuring pressure variations in air. Pirani gauges operate by heating a wire by passing current through it, and monitoring the resulting changes in the resistance of the wire. The resistance in the wire is a function of the wire temperature, and the wire temperature is a function of the cooling rate of the wire, which in turn is a function of the ambient pressure. Thus, changes in resistance of the wire are measured in order to determine the changes in pressure. However, thermal conductivity of air is almost constant from atmospheric pressure to around 10 mBar. Hence, the pirani gauge is only useful for measuring pressure variations below approximately 10 mBar.

Another technique used to sense pressure variations uses a silicon based pressure sensor. The two commonly used types of silicon-based pressure sensors are piezoresistive and capacitive pressure sensors. Both the piezoresistive and capacitive pressure sensor uses a thin silicon diaphragm, which is fabricated by anisotropic etching of a thicker silicon substrate. In the piezoresistive pressure sensor, pressure variations in one side of the diaphragm results in a flexure, which is directly proportional to the applied pressure. The piezoresistive type of pressure sensor relies on stress-induced changes in the resistivity of diffused resistors in the diaphragm. The capacitive sensor relies on capacitive variations between the diaphragm and a metal plate, which is placed parallel and close to the diaphragm. Further, both types of the pressure sensors require the silicon chip attached to the metal plate to hermetically seal the chamber on one side of the diaphragm. However, the requirement of hermetic sealing increases the cost of the pressure sensor as the sealing is performed on an individual chip rather than on a complete wafer level.

Another type of pressure sensor employs the concept of ionization to sense pressure variations. The ionization gauge involves a heating filament that emits electrons which ionizes gas molecules. An ion collector then captures the ions. The amount of gas molecules available to be ionized decreases as the gas pressure decreases. This ultimately results in lesser ions to be received by the ion collector. However, the ionization gauge is effective only at low pressures (around at 0.00013 mBar). Further, several devices and electrical connections required by the ionization gauge burn out at atmospheric pressures.

One or more of the above-mentioned pressure sensors suffer from at least one disadvantage. Hence, there is a need of a pressure sensor that is operable in the pressure ranges below the atmospheric pressure. Further, the pressure sensor should have a good sensitivity and resolution to the pressure variations. Also, there is a need of significant cost reduction in the fabrication of the pressure sensor with respect to the available techniques.

SUMMARY

In accordance with an aspect of the present invention, a pressure sensor is provided. The pressure sensor includes a substrate and several support structures attached to the substrate. The pressure sensor further includes a strut structure integrated with a heating element. The strut structure is engaged with the support structures so as to create an air gap between the heating element and the substrate. Further the heating element has an electrical resistance proportional to changes in air pressure in the air gap.

In accordance with another aspect of the present invention, a pressure sensor is provided. The pressure sensor includes a substrate and several support structures attached to the substrate. The pressure sensor further includes a cantilever integrated with a heater. The cantilever is engaged with the support structures so as to create an air gap between heater and the substrate. Further, current flowing through the heater at a constant voltage varies with changes in air-pressure in the air gap.

In accordance with yet another aspect of the present invention, a method for manufacturing a pressure sensor is disclosed. The method includes attaching several support structures on a substrate. The method further includes supporting a cantilever with an integrated heater on several support structures. The method further includes positioning the heater with respect to the substrate so as to create an air gap between the substrate and heater.

BRIEF DESCRIPTION OF DRAWINGS

The above and other items, features and advantages of the invention will be better understood by reading the following more particular description of the invention in conjunction with the accompanying drawings wherein.

DETAILED DESCRIPTION

The present invention provides a pressure sensor, a method for manufacturing pressure sensor and a method for sensing pressure variations. The pressure sensor is capable of sensing pressure variations in air or any other gas. The pressure sensor utilizes the concept of dependence of heat loss in a heating element due to variations in air-pressure around the heating element.

Figure 1:
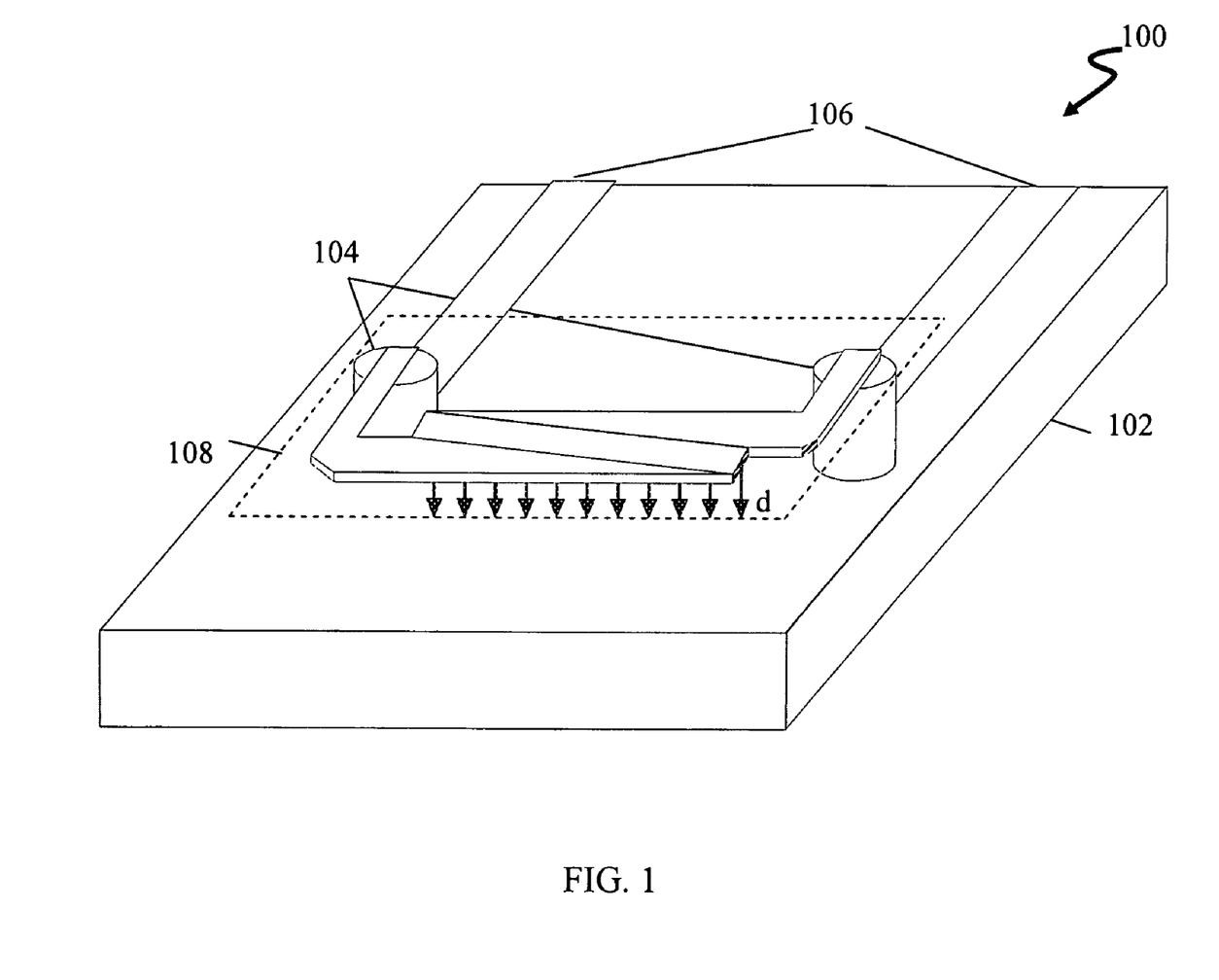
FIG. 1 shows a pressure sensor in accordance with an embodiment of the invention.

FIG. 1 shows a pressure sensor 100 in accordance with an embodiment of the invention. Pressure sensor 100 includes a substrate 102, support structures 104, electrical connections 106, and a sensing assembly 108. Substrate 102 comprises electrically non-conductive. In one embodiment of the invention, substrate 102 comprises silicon. In another embodiment of the invention, substrate 102 is formed of glass. Support structures 104 are attached on substrate 102. Support structures 104 are used to support sensor assembly 108 and maintain a pre-defined distance between substrate 102 and sensor assembly 108. Sensor assembly 108 is explained in detail in conjunction with FIG. 2.

Since support structures 104 are electrically isolated, electrical connections 106 are provided to connect to support structures 104. In one embodiment of the invention electrical connections 106 are two metal strips each connected to one support structure 104. This enables to provide either current or voltage to support structures 104 and measure voltage or resistance respectively. In one embodiment of the invention support structures 104 comprise high doping concentration of single crystal silicon. In another embodiment of the invention support structures 104 comprise metal. However, the use of metal will increase the complexity in fabrication of pressure sensor 100 and lead to inconsistency in thermal expansion of metal and silicon in support structures 104 and the substrate respectively. In one embodiment of the invention, support structures 104 are cylindrical in shape. However in various other embodiments of the invention, support structures 104 may be meandering. This may increase the thermal isolation of sensor assembly 108.

Figure 2:
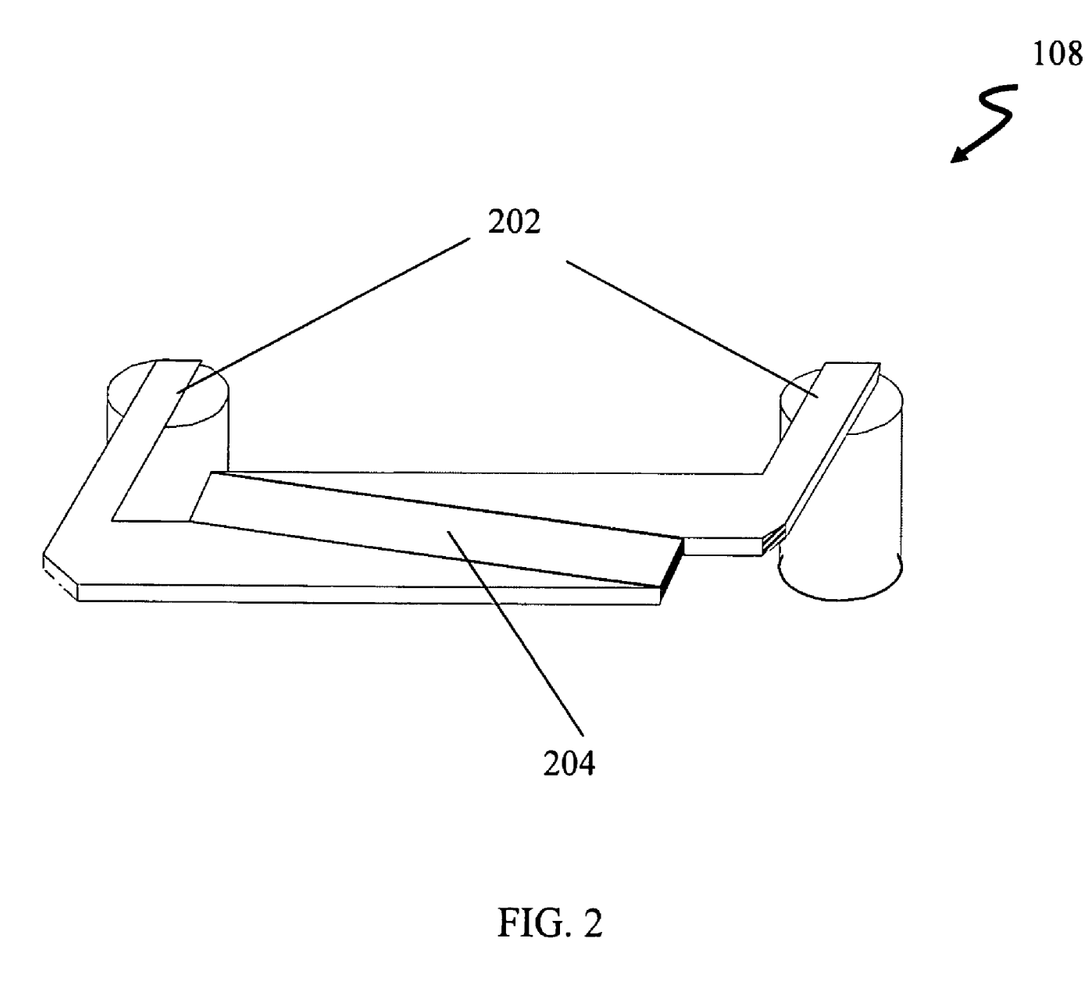
FIG. 2 shows a sensing assembly integrated in the pressure sensor in accordance with an embodiment of the invention.

FIG. 2 shows sensing assembly 108 integrated in pressure sensor 100 (as shown in FIG. 1). Sensing assembly 108 includes a cantilever 202 and a heater 204 integrated in cantilever 202. In one embodiment of the invention, cantilever 202 is 'U-shaped'. In another embodiment of the invention, sensing assembly 108 includes a strut structure integrated with a heater. The strut structure is engaged with support structures 104. Cantilever 202 comprises silicon, and heater 204 is integrated into cantilever 202 by changing the doping concentration of silicon between the two regions. In one embodiment of the invention, heater 204 is doped with less dopant atoms than cantilever 202. In various embodiments of the invention, boron, arsenic and phosphorous may be used for doping the silicon in heater 204. The reduced doping increases electrical resistance of heater 204 compared to cantilever 202. In yet another embodiment of the invention, sensing assembly 108 includes cantilever 202 and a heating element. The heating element may have a different material composition than cantilever 202. The heating element is a three dimensional rectangular strip comprising low-doped silicon.

Referring to FIG. 1, when a current is passed through electrical connections 106 to supporting structures 104, heater 204 becomes warm relative to the surrounding environment. The sensitivity of pressure sensor 100 is dependent on the distance (d) between substrate 102 and cantilever 202, which is defined by the height of support structures 104. In various embodiments of the invention, support structures 104 have a height ranging from 0.25 micron to 10 microns. In one embodiment of the invention, support structures 104 have a height of 6 micron. The distance is of the order of mean free path length in air for pressure sensor 100 in order to enhance the sensitivity of the sensor to pressure variations at the atmospheric pressure. The mean free path length in air is the mean distance traveled by a particle in the air before undergoing a deflection or a collision with another particle in the air. For example, at room temperature and at atmospheric pressure, the mean free path length in air is around 60 nm. When the distance is small, a significant fraction of heat is passed on from heater 204 through the air to substrate 102. Further, for a small air gap spacing the heat conductivity is strongly dependent on ambient air pressure. Therefore, if the ambient air pressure changes, the rate of cooling of heater 204 changes, resulting in a change in the temperature of heater 204, which in turn results in a change in the resistance of heater 204. This is because the material composition of heater 204, i.e., the silicon, has strong temperature dependence of its electrical resistance. This change in the resistance of heater 204 is proportional to the change in the air-pressure. Hence, sensing assembly 108 detects and enables the measurement of the pressure variations. In one embodiment of the invention, pressure sensor 100 measures the pressure variations from a range of 1 atm (atmosphere) to 100 mBar.

Figure 3:
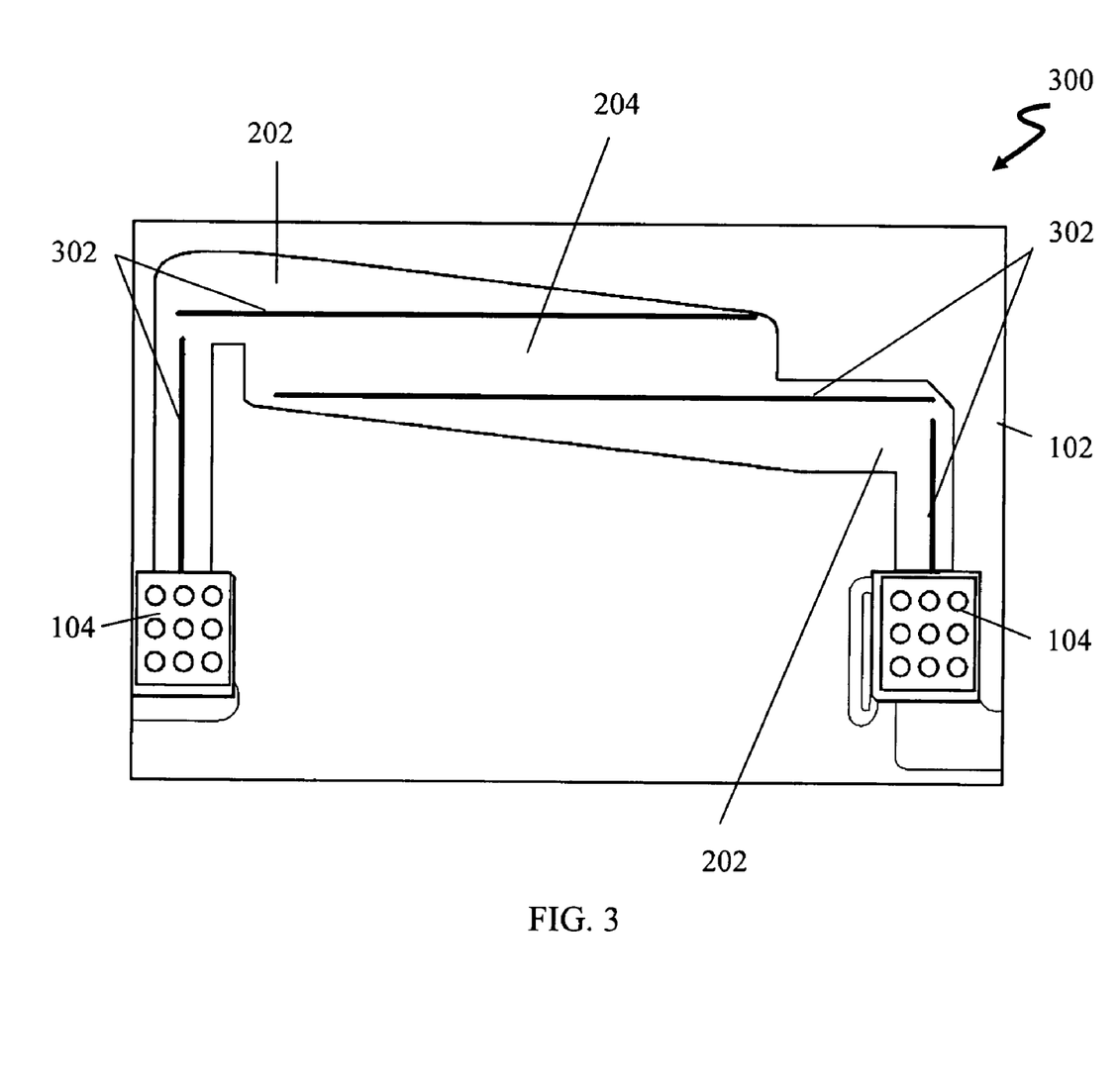
FIG. 3 shows a pressure sensor in accordance with another embodiment of the invention.

FIG. 3 shows a pressure sensor 300 in accordance with an embodiment of the invention. The pressure sensor 300 is formed using single crystal silicon applying micromachining techniques. The pressure sensor 300 is a fabricated structure of pressure sensor 100 as explained in conjunction with FIGS. 1 and 2. Substrate 102 holds support structures 104. In this embodiment of the invention, the height of support structures 104 is around 6 microns. Further, cantilever 202 with the integrated heater 204 is mounted on support structures 104. Cantilever 202 is 'U-shaped'. Within cantilever 202 four stiffening elements 302 are added to strengthen cantilever 202. In one embodiment of the invention, stiffening element 302 comprises silicon and has a thickness greater than the thickness of the rest of cantilever 202. In various other embodiments of the invention, stiffening element 302 comprises materials such as silicon nitride, silicon dioxide, poly-silicon, and amorphous silicon. In yet another embodiment of the invention, stiffening element comprises the same material as used in cantilever 202, in case cantilever 202 comprises any material other than silicon. However, using any material other than silicon may introduce stress due to mismatch in coefficients of thermal expansion for different materials. In this embodiment of the invention, the length of heater 204 is around 150 microns and the thickness of heater 204 is around 0.5 micron. However, due to the fabrication effects, cantilever 202 bends towards substrate 102 along the length of heater 204. Hence, near the center of the length of heater 204, the height of heater 204 is about 3.2 microns above substrate 102.

Figure 4:
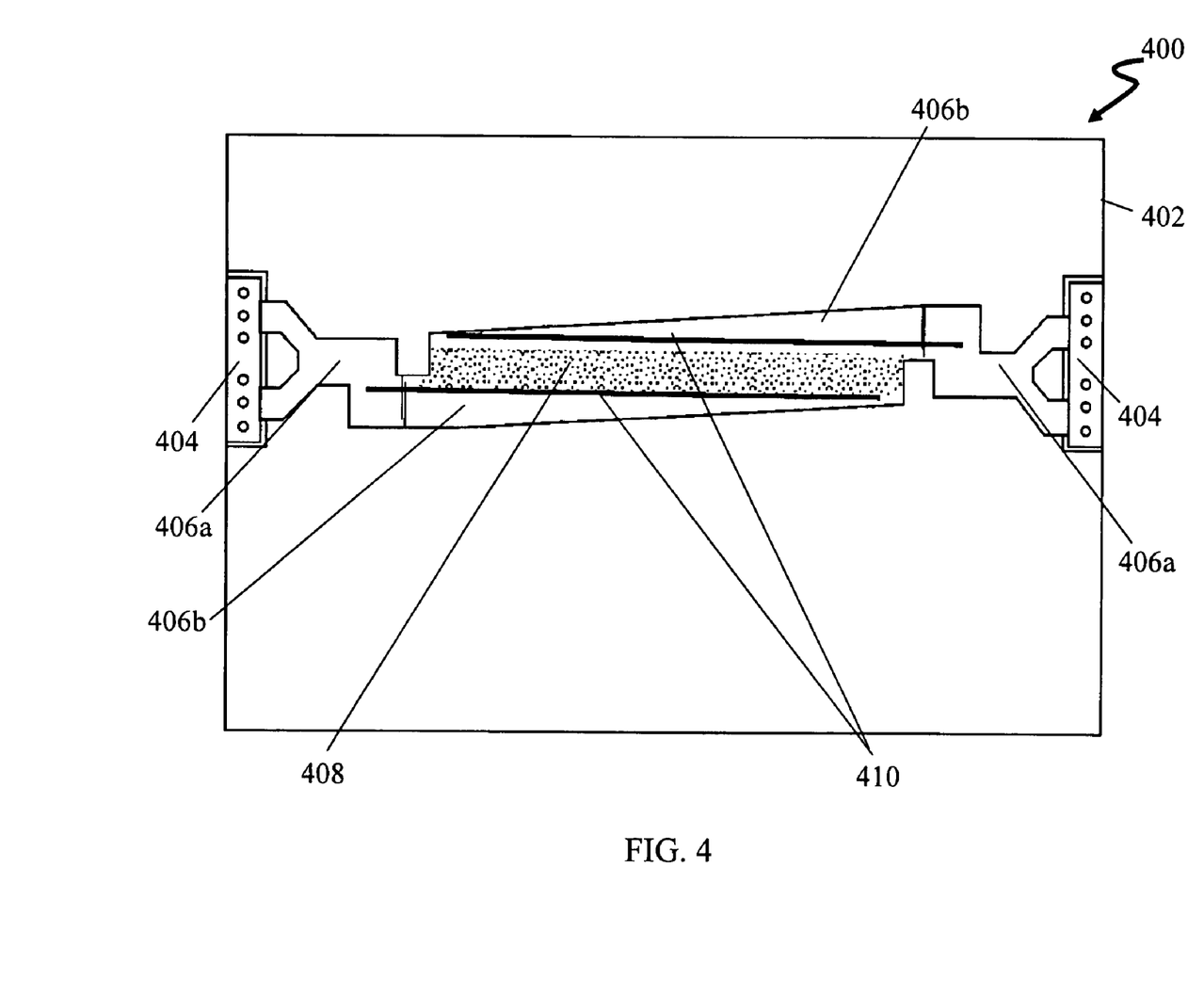
FIG. 4 shows a pressure sensor in accordance with yet another embodiment of the invention.

FIG. 4 shows a pressure sensor 400 in accordance with another embodiment of the invention. The pressure sensor 400 is formed using single crystal silicon applying micromachining techniques. The pressure sensor 400 includes a substrate 402, support structures 404, support beams 406 and a heater 408. In this embodiment of the invention, heater 408 is clamped within support beams 406. Support beams 406 are attached to support structures 404. Support structures 404 have a high doping concentration, thus enabling electrically conductivity and mechanical support to support beams 406. In this embodiment of the invention, support structures 404 have a thickness of 0.5 micron. Each support beam 406 has two regions 406a and 406b, with different thickness in each region. In various embodiments of the present invention, the thickness of region 406a varies from 0.05 micron to 0.5 micron, while the thickness of region 406b varies from 0.5 micron to 2 micron. In one embodiment of the invention, the thickness of region 406a in each of support beams 406 is 0.15 micron, while the thickness of region 406b is 0.5 micron. Further, a change in the doping concentration of silicon in the support beams 406 forms heater 408. Heater 408 has a low doping concentration with respect to support beams 406. The thickness is reduced in region 406b in order to increase the sensitivity of heater 408 and also to reduce the power requirements of pressure sensor 400. However, the thickness of region 406b is related to the length and thickness of heater 408 and heater 408 has a thickness of 0.150 micron. Hence, heater 408 and region 406b (of both support beams 406) have identical thickness but the doping concentration is different. The prototype 400 has a greater stiffness due to straight support beams instead of 'U-shaped' support beams and is hence mechanically more robust. Further, in order to increase the robustness of the pressure sensor, two stiffening elements 410 are embedded in region 406a of each support beam 406. In one embodiment of the invention, stiffening elements 410 comprises silicon and have a greater thickness than the thickness of region 406a.

Figure 5:
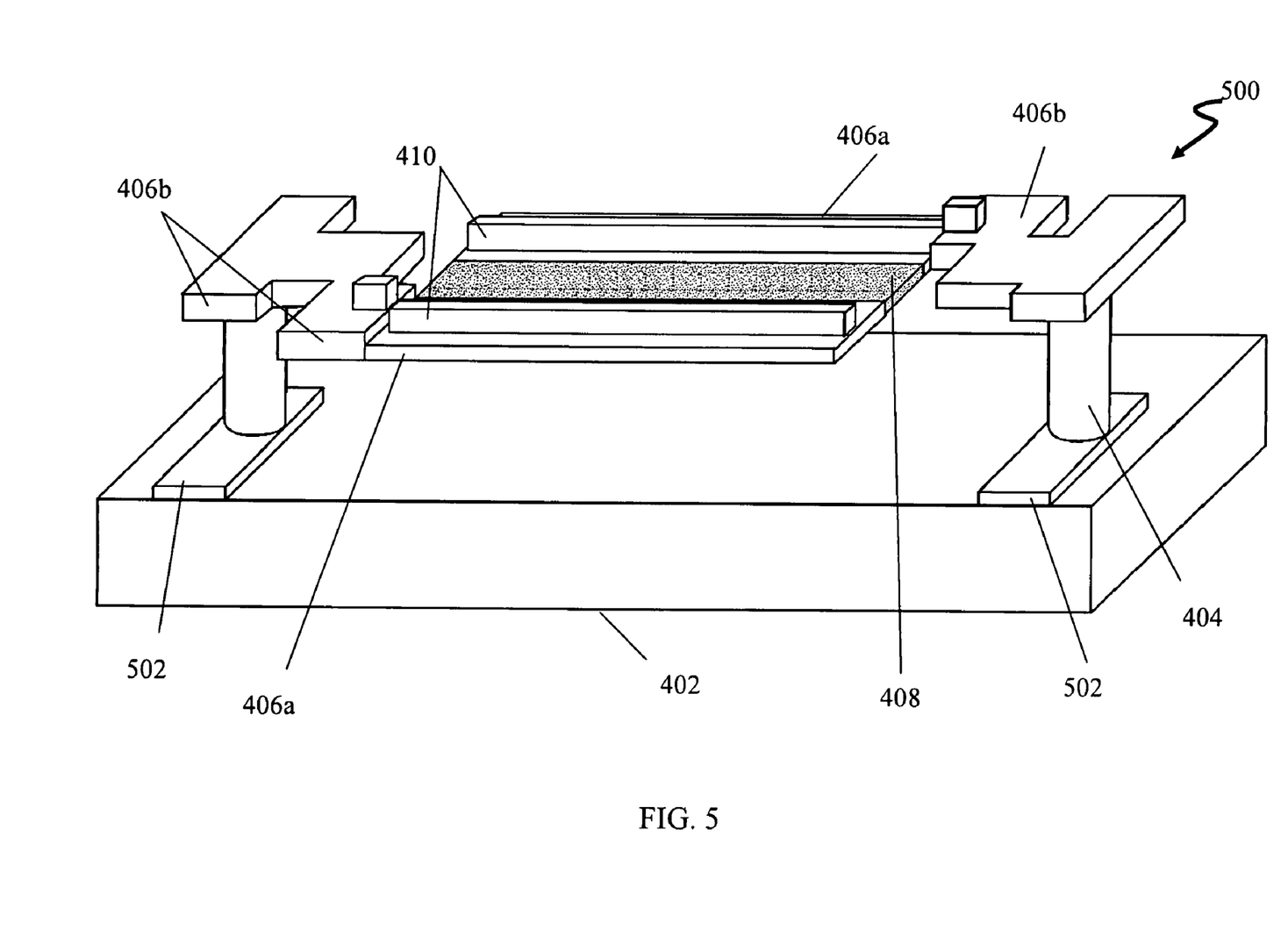
FIG. 5 shows a side-view of the pressure sensor, shown in the FIG. 4, in accordance with one embodiment of the invention.

FIG. 5 shows a side-view 500 of the pressure sensor 400 in accordance with one embodiment of the invention. The side-view 500 shows electrical connections 502 attached to substrate 402. These electrical connections 502 provide electrical contact to each support structure 404. However, in this embodiment of the invention, support beams 406 have a different shape with respect to support beams 406 shown in FIG. 4. Each of support beams 406 has two regions 406a and 406b with different thickness in each region. In this embodiment of the invention, the thickness of region 406a in each of support beam 406 is 0.15 micron, while the thickness of region 406b is 0.5 micron. Heater 408 also has a thickness of 0.15 micron. The thickness is reduced in region 406b in order to increase the sensitivity of heater 408 and also to reduce the power requirements of pressure sensor 400. Two stiffening elements 410 embedded in region 406a of each support beam 406 have a thickness equal to the thickness of region 406b. The distinction in thicknesses of each element of pressure sensor 400 is illustrated clearly in conjunction with FIG. 6.

Figure 6:
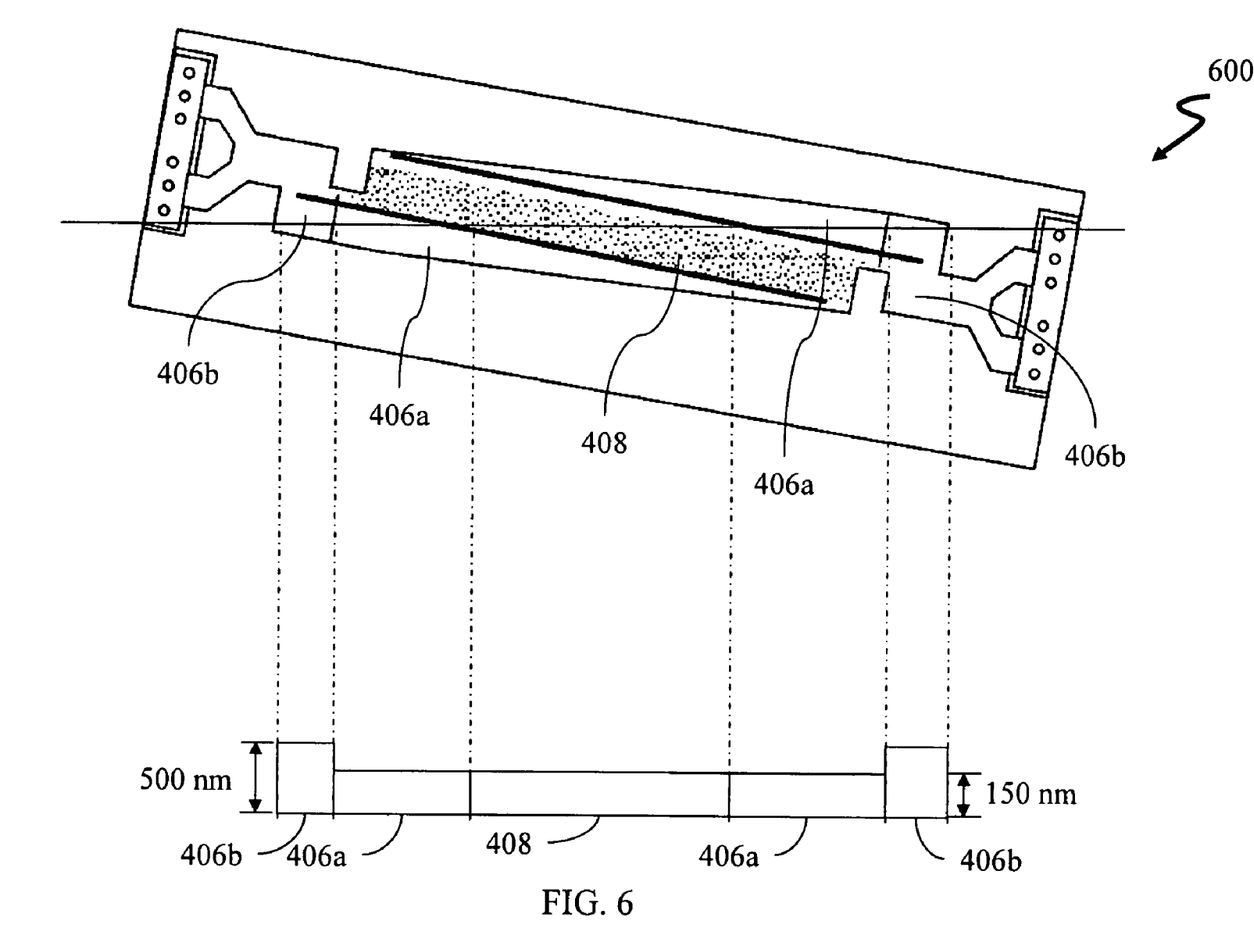
FIG. 6 shows a cross-sectional view of the pressure sensor, shown in the FIG. 4, in accordance with another embodiment of the invention.

FIG. 6 shows a cross-sectional view 600 of the pressure sensor 400 in accordance with another embodiment of the invention. In this embodiment, region 406a has a thickness of 0.15 micron, while region 406b has a thickness of 0.5 micron. Further, heater 408 also has a thickness equal to that of region 406a at 0.5 micron.

Figure 7:
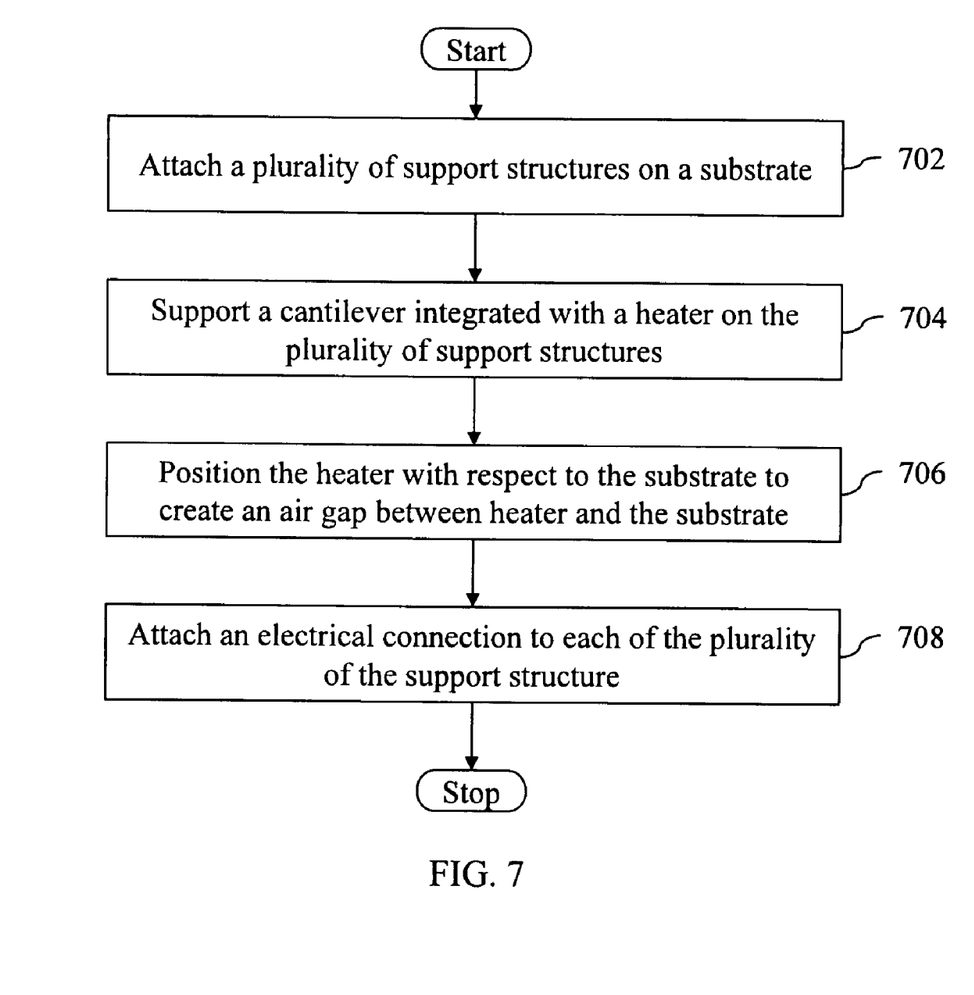
FIG. 7 represents a flowchart describing a method for manufacturing pressure sensor in accordance with an embodiment of the invention.

FIG. 7 represents a flowchart describing a method for manufacturing pressure sensor in accordance with an embodiment of the invention. At step 702, a plurality of support structures are attached on a substrate. At step 704, a cantilever integrated with a heater is supported on the plurality of support structures. At step 706, the heater is positioned with respect to the substrate to create an air gap between the heater and the substrate. In an embodiment of the invention, the air gap is adjusted to be comparable to mean free path length in air. For example, the air gap can be maintained to be at around 6 microns. At step 708, an electrical connection is attached to each of the plurality of support structures. In an embodiment of the invention, the electrical connection is formed of metal strips. This enables to provide either current or voltage to support structures and measure voltage or resistance respectively. When voltage is applied across the pressure sensor, the variations in pressure result in change in resistance and hence in the current flowing through the pressure sensor.

Figure 8:
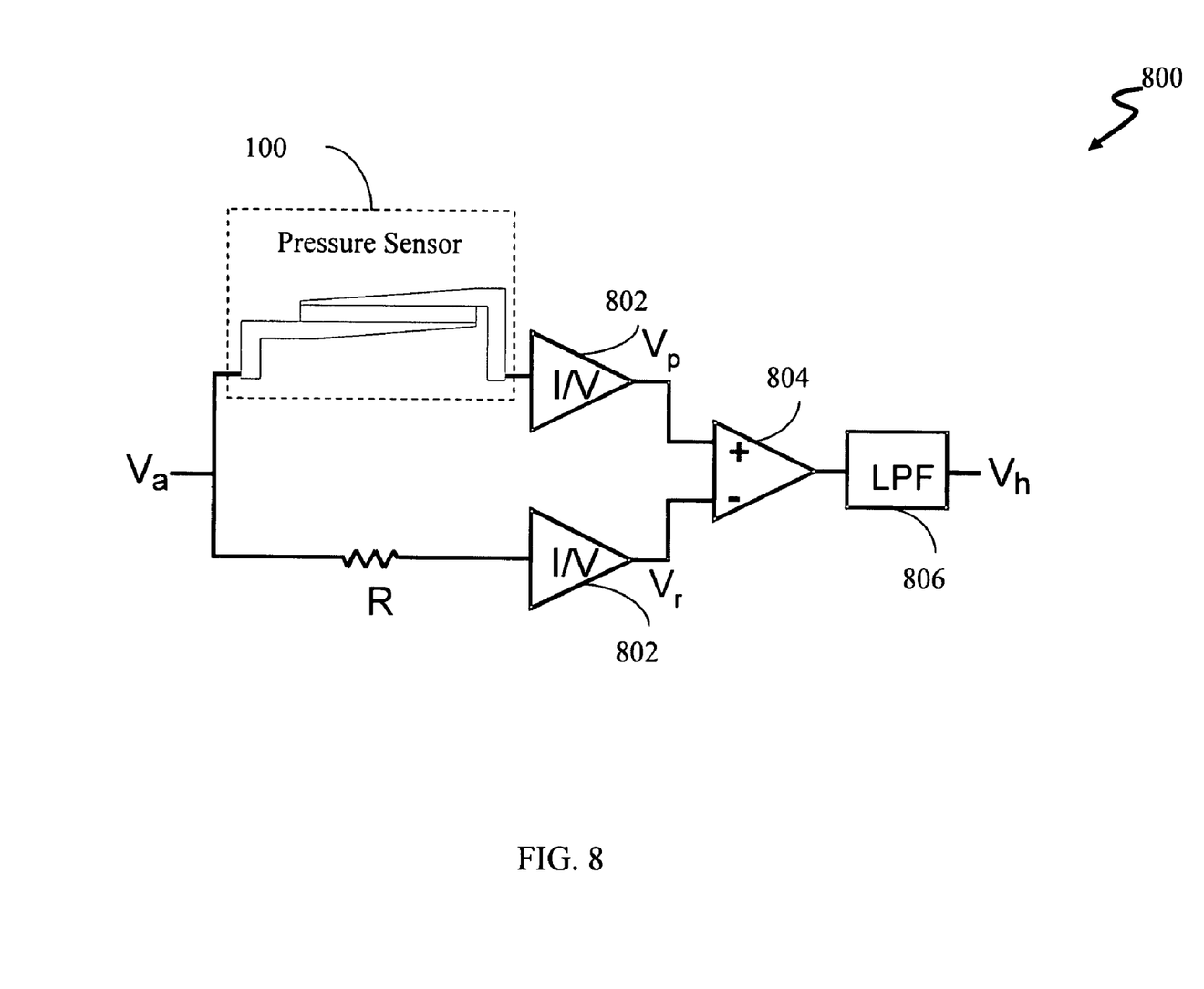
FIG. 8 shows a schematic converter circuit in accordance with an embodiment of the invention.

FIG. 8 shows a schematic converter circuit 800 in accordance with an embodiment of the invention. The converter circuit 800 includes pressure sensor 100, two current to voltage converters 802, a differential amplifier 804 and a low pass filer 806. Pressure sensor 100 is applied with an input voltage $V_a$. In this embodiment of the invention, the input voltage $V_a$ is constant. The applied voltage $V_a$ induces a current flow in a heater of pressure sensor 100. Further, flowing current creates an increase in resistance in pressure sensor 100 due to the increase in temperature resulting from the electrical power dissipated in the sensor. Pressure variations in pressure sensor 100 results in change in the resistance and hence the current flowing through the heater of pressure sensor 100. This current variation is measured with respect to a reference current generated by using a reference resistance (R). The variations in current flowing through the heater are converted into corresponding variations in voltage $V_p$ by using current to voltage converter 802. Similarly, the reference current is converted into corresponding reference voltage $V_r$ by using current to voltage converter 802. Differential amplifier 804 amplifies the voltage variations by multiplying the difference between $V_p$ and Vr by gain of differential amplifier 804 to generate voltage ($V_h$) as the output. In an embodiment of the invention, the gain of differential amplifier 804 ranges from 50 to 100. Further, low pass filter 806 is used to filter out any unwanted high frequency noise in the voltage $V_h$. Hence, the input resistance variations resulting from changes in pressure are converted to variations in the voltage $V_h$ at the output of converter circuit 800.

Figure 9:
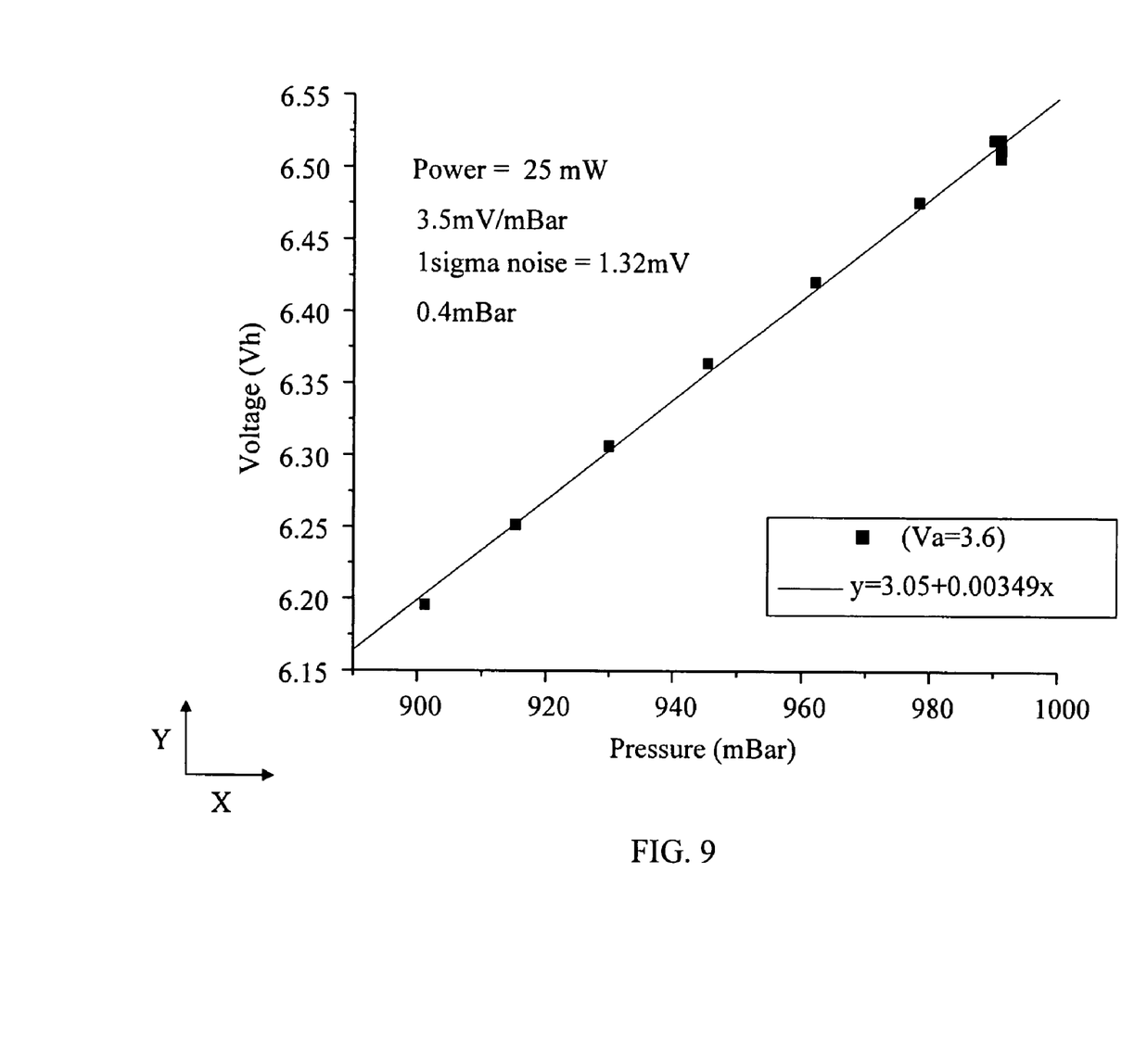
FIG. 9 shows a graphical response of the pressure sensor as a function of pressure in accordance with one embodiment of the invention.

FIG. 9 shows a graphical response of a pressure sensor as a function of ambient pressure in accordance with one embodiment of the invention. An exemplary voltage $V_a$ of 3.6 Volts is applied across a heater through electrical connections connected to support structures. The voltage $V_a$ of 3.6 Volts generates around 25 mW of heating power. The X-axis of the graph represents the pressure in millibars, while the Y-axis represents the voltage $V_h$ (in volts) at the output of converter circuit 800. Due to the variations in the air-pressure around the heater there is a variation in rate of cooling of the heater, which, results in a change in the resistance of the heater. Further, the sensitivity of the pressure sensor is defined as the variation in voltage $V_h$ when there is 1 mBar change in the air pressure in the air gap between heater and the substrate. This sensitivity is dependent on both the sensitivity of the pressure sensor and gain of the converter circuit 800 as shown in FIG. 8. In this embodiment of the invention, the sensitivity of the pressure sensor is 3.5 mV/mBar, at the applied voltage of 3.6V (or 25 mW of power). The sensitivity is also approximately equal to and is represented by slope of the equation shown in the FIG. 9. Further, the pressure sensor is also subjected to noise, which has a one sigma value of around 1.32 mV. The noise is an electrical noise measured at the output of the converter circuit 800. The sensitivity of the pressure sensor increases with increasing power. In this embodiment for the pressure range shown in FIG. 9, the sensitivity increases with decreasing pressure. The variation in sensitivity depends on the pressure range used for measurement. For example, for very low pressures the sensitivity does not increases with decreasing pressure.

Another parameter used to gauge responsiveness of a pressure sensor is its resolution. The resolution of the pressure sensor is the ratio of the noise to the sensitivity. Hence, at the applied voltage of 3.6 V, the resolution becomes 0.4 mBar around atmospheric pressure measured over a 100 kHz bandwidth. Filtering the output to a bandwidth comparable to the pressure sensor's time constant further increases the resolution. The time constant of the pressure sensor is proportional to the response of the pressure sensor to change in the air pressure. Temporal response of the pressure sensor is very fast, with a time constant of approximately 100 microseconds. The sensitivity and time constant of the pressure sensor can be further improved by reducing the thickness of heater of the pressure sensor which also reduces the power consumption required by heater to reach at a given temperature. The sensitivity can be further optimized to a given pressure range by changing the spacing of the air gap. For example, reducing the spacing increases the sensitivity to pressures around atmospheric pressure (or higher).

Figure 10:
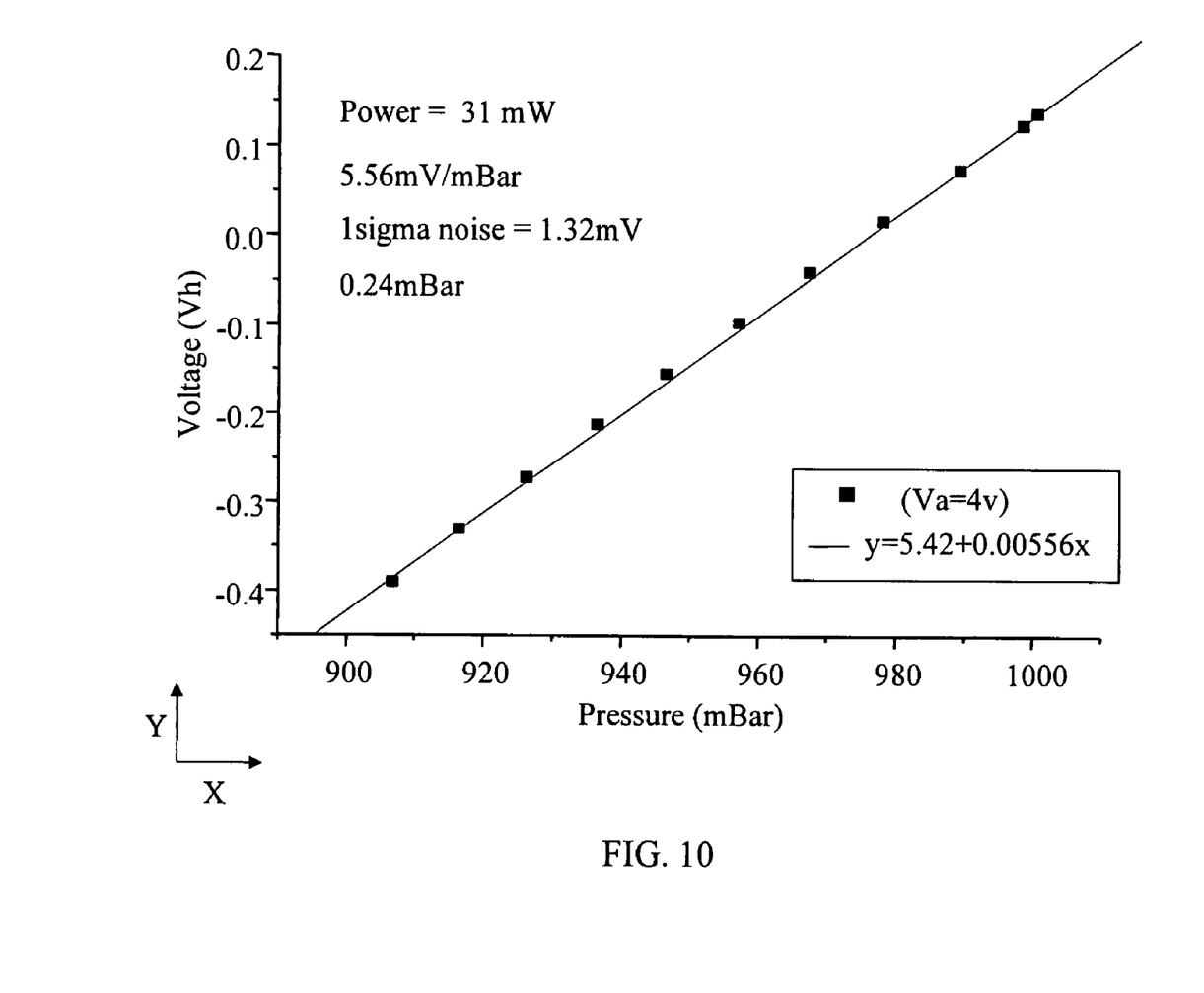
FIG. 10 shows a graphical response of the pressure sensor as a function of pressure in accordance with another embodiment of the invention.

FIG. 10 shows a graphical response of the pressure sensor as a function of ambient pressure in accordance with another embodiment of the invention. An exemplary voltage $V_a$ of 4 Volts is applied across a heater through electrical connections connected to support structures. The voltage $V_a$ of 4 Volts generates around 31 mW of heating power. The X-axis of the graph represents the pressure in millibars, while the Y-axis represents the voltage $V_h$ at the output of converter circuit 800. Increasing the input power increases the sensitivity of the pressure sensor and the sensitivity is recorded as 5.56 mV/mBar, at the applied voltage of 4V (or 31 mW of power). The sensitivity is also approximately equal to and is represented by slope of the equation shown in the FIG. 10. However the one sigma value of the electrical noise remains the same at 1.32 mV even though the power is increased. Hence, the resolution of the pressure sensor increases to 0.24 mBar around atmospheric pressure. The sensitivity and the time constant of the pressure sensor enable it to be used as a microphone. The bandwidth of the microphone can be brought within an optimum range of 10-20 kHz by reducing the thickness of the heater to a range of 50-150 nm, and decreasing the length to the range of 5-50 microns and the air gap to a range of 1-10 microns.

In the aforesaid description, specific embodiments of the present invention have been described by way of examples with reference to the accompanying figures and drawings. One of ordinary skill in the art will appreciate that various modifications and changes can be made to the embodiments without departing from the scope of the present invention as set forth in the claims below. Accordingly, the specification and figures are to be regarded in an illustrative rather than a restrictive sense, and all such modifications are intended to be included within the scope of present invention.

I claim:

1. A pressure sensor comprising:
    a plurality of support structures, wherein the support structures are attached to a substrate;
    a strut structure integrated with a heating element, wherein the strut structure is engaged with the plurality of support structures, the strut structure forming an air gap between the heating element and the substrate; and
    wherein the heating element has an electrical resistance proportional to changes in air pressure in the air gap.

2. The pressure sensor of claim 1, wherein the substrate comprises an electrically non-conductive material.

3. The pressure sensor of claim 1, wherein the plurality of support structures comprise high-doped silicon.

4. The pressure sensor of claim 1, wherein the strut structure is a cantilever.

5. The pressure sensor of claim 1, wherein the heating element is a three dimensional rectangular strip comprising low-doped silicon.

6. The pressure sensor of claim 1, wherein the air gap is on the order of the mean free path length in air.

7. A pressure sensor comprising:
    a substrate;
    a plurality of support structures being attached to the substrate, wherein the plurality of support structures comprise high-doped silicon; and
    a cantilever integrated with a heater comprising low-doped silicon, wherein the cantilever is engaged with the plurality of support structures, the cantilever being placed so as to create an air gap between heater and the substrate;
    wherein the current flowing through the heater at a constant voltage varies with changes in air-pressure in the air gap.

8. The pressure sensor of claim 7, wherein the substrate comprises an electrically non-conductive material.

9. A method comprising:
    attaching a plurality of support structures on a substrate, wherein the plurality of support structures comprise high-doped silicon;
    supporting a cantilever integrated with a heater on the plurality of support structures, wherein the heater comprises low-doped silicon; and
    positioning the heater with respect to the substrate to create an air gap between heater and the substrate.

10. The method of claim 9 further comprises attaching an electrical connection to each of the plurality of the support structures.

11. The method of claim 9, wherein positioning the heater comprises adjusting the heater to maintain the air gap proportional to the mean free path length in air.

12. A method for sensing pressure variations in a pressure sensor, the pressure sensor comprising a plurality of support structures attached on a substrate, the method comprising:
    providing a first parameter to a cantilever integrated with a heater, wherein the cantilever is engaged with the plurality of support structures to create an air gap between the heater and the substrate; and
    measuring a change in a second parameter of the heater based on the variations in air-pressure in the air gap keeping the first parameter constant.

13. The method of claim 12, wherein providing the first parameter comprises supplying current to the heater through the cantilever.

14. The method of claim 13, wherein measuring the change in the second parameter comprises determining change in resistance of the heater.

15. The method of claim 12, wherein providing the first parameter comprises providing voltage across the heater through the cantilever.

16. The method of claim 15, wherein measuring the change in the second parameter comprises determining change in current through the heater.

17. The method of claim 12, wherein providing the first parameter comprises supplying constant power to the heater through the cantilever.

18. The method of claim 17, wherein measuring the change in the second parameter comprises determining a change in one of current through the heater and voltage applied across the heater.

* * * * *